Dec. 3, 1963  R. G. BRINGOLF  3,112,771
RESILIENT LINING FOR LIGHT WEIGHT HOSE
Filed Jan. 31, 1961  2 Sheets-Sheet 1
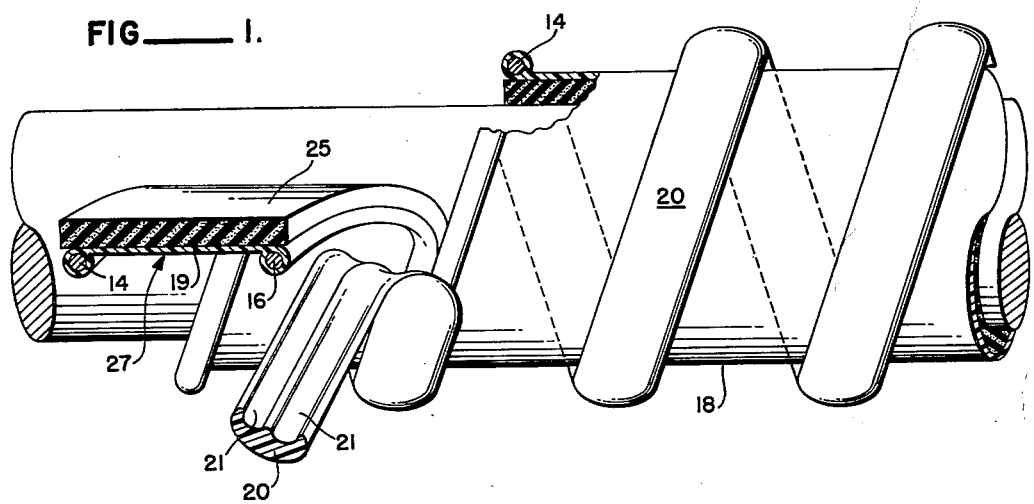
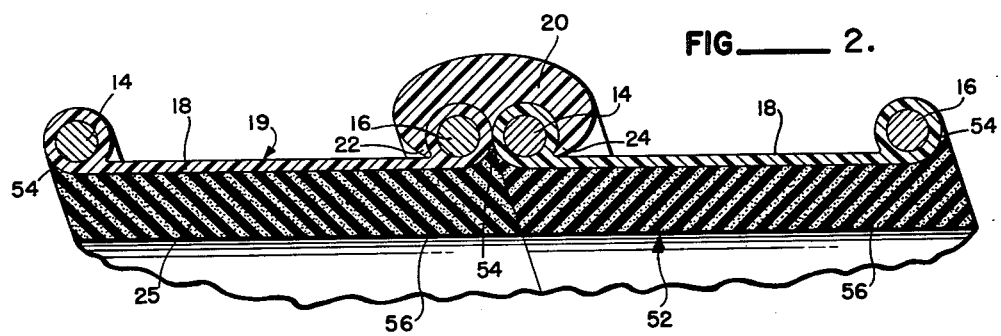
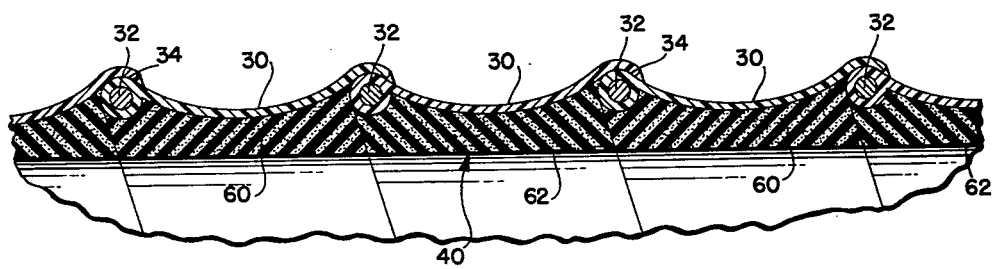
RICHARD G. BRINGOLF
INVENTOR.

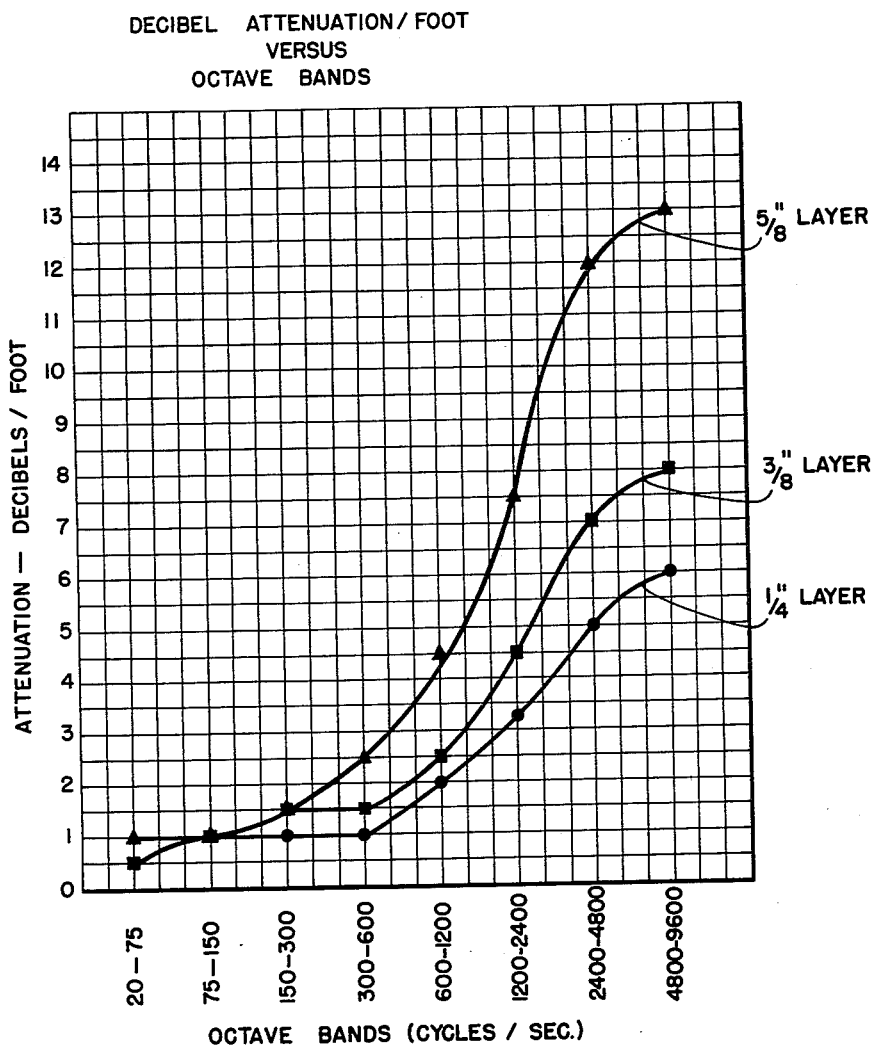

United States Patent Office 3,112,771
Patented Dec. 3, 1963

3,112,771
RESILIENT LINING FOR LIGHT WEIGHT HOSE
Richard G. Bringolf, 103 Lander St., Seattle 4, Wash.
Filed Jan. 31, 1961, Ser. No. 86,155
3 Claims. (Cl. 138—129)

This present invention relates to the general art of flexible hoses that are characterised by their very light weight and by the fact that they are supple enough to be bent around small radius curves. More particularly, this present invention relates to a lining for such hose which tends to reinforce it against kinking when bent sharply and which will give a smooth interior surface especially for the efficient transmission of air and other gases under positive or negative pressures.

There has been an increasing demand for light weight conduits for the handling of low pressure gases and air in a wide field of commercial and domestic application. The increased emphasis placed upon adequate ventilation and air conditioning has created a demand for a fluid conducting type of flexible conduit suitable for the conduction of ventilating air, gases, and the like, but which by the nature of its structure is not restricted to these applications. It is very desirable particularly when remodeling old structures, offices, industrial plants and homes to employ a flexible member, preferably a fluid tight hose which can be bent around short radii and which under such conditions will retain its cross sectional shape without buckling and which will at all times present a smoothness of bore not common to the light weight hoses normally employed for such purposes. By providing a light weight cellular lining which can be fixedly secured to the inner surface of a flexible hose many of the problems normally encountered can be adequately met and will additionally provide insulation against the conduction of heat and noise.

A principal object of this present invention therefore is to provide a cellular lining for flexible hose which serves to smooth out the entire internal bore of the hose so that it will have the minimum of frictional loss in the conduction of low pressure fluids, especially air.

A further object of this present invention is to provide a light weight cellular lining for a flexible hose which will prevent its buckling and preserve its normal cross section even though it be made to pass around short radii in order to meet difficult installation situations.

A further object of this present invention is to provide a smoothing out of the internal surface of the flexible hose which will prevent turbulence which in turn disturbs the free flow of gases directed through this type of hose.

A further object of this present invention is to provide a light density cellular lining for a flexible hose which is easily displaced or compacted under the force of the hose wall where it bends inwardly at the time of flexuous stress and which cellular material may be supplied in sufficient thickness to accept such displacement without appreciably disturbing its interior surfaces so that the bore of the hose will thus remain smooth with a minimum frictional loss to the passage of air or other low pressure fluids.

A further object of this present invention is to provide a light weight cellular lining for a light weight supple hose suitable for the conduction of ventilating gases, air, or the like with the minimum loss or gain of heat as the gases are moved from one location to another.

A further object of this invention is to provide a cellular lining for light weight hose that serves as an effective trap for noises which are conveyed through the hose or noises directed transversely of the hose.

Further objects, advantages and capabilities will be apparent from the description and disclosure in the drawings or may be comprehended or are inherent in the device.

In the drawings:

FIGURE 1 illustrates a form of flexible hose having a gas-tight outer wall which is spirally constructed and reinforced with wire at each of its edges. The view is in elevation and partly broken away and sectioned to show the cellular lining as used therewith.

FIGURE 2 is a fragmentary, enlarged sectional view through the form of hose shown in FIGURE 1 and illustrating how my cellular lining fills in the spiral voids which might otherwise cause turbulence.

FIGURE 3 is a fragmentary, sectional view of a spirally made flexible hose of modified form and illustrating how my cellular lining smooths out the interior bore thereof.

FIGURE 4 illustrates a graph showing the acoustical efficiency of different thicknesses of cellular lining material for flexible hoses.

The various figures of the drawings illustrate various types of light weight flexible hose, whose flow, thermal, and noise characteristics can be very appreciably improved by the use of my cellular lining. Hoses of this general type supplied to the trade must be made by the manufacturer to be self supporting and to retain their bore shape when conveying gases at low pressures. These hoses may also be used as suction hoses where the pressures are relatively low. In order to retain the structural advantages of the form of material employed, hoses of this order are normally made with a grooved wall, the grooves being either annularly or spirally applied throughout the length of the hose. The single fabric wall construction gives an interior and outer corrugated surface. As an example, such hose in a 6 inch diameter weighs substantially 1.4 pounds per running foot and may be flexed or bent around a 24 inch radius following the formula that the radius of curvature equals four times the hose diameter.

The ridged enclosing wall may be achieved by any of a number of means as has been illustrated; but generally consists of two types, one the general type in which the hose is molded of plastic material so as to provide the ridged outer form. In such a type the outer wall is given sufficient thickness so that it will be to a degree self supporting. It may be made of various types of materials, such as fabric that is suitably treated with stiffening material or it may be molded of plastic material of a temper to give resilience but still have strength enough to prevent its being flattened particularly when conveying gases at negative pressure.

FIGURE 1 illustrates a second general form of reinforcement of the enclosing envelope of the hose which is normally made in a spiral strip arrangement with each margin reinforced by the usual spirally wound wires as 14 and 16 which tend to keep the intervening strip material 18 stretched so that it presents a relatively smooth outside appearance. This spiral strip 19 may be made up in advance by being fabricated into a hose. Means must be employed to join together the edges reinforced by wires 14 and 16 to preserve an air tight and gas tight joining. One way commonly employed is to use a plastic strip 20 which may be molded by extrusion to engage the outer portions of the fabric covered wires as by the points 22 and 24. When in use strip 20 is wound spirally around the hose throughout its length. In FIGURE 1 a portion of this strip has been bent back to further illustrate the two partial grooves 21 of the interior of the strip. This view further illustrates one preferred method of placing and securing the cellular hose lining in place. Lining 25 is provided in a strip of a width substantially equal to the width of the outer covering 18 including the wire reinforced margins. Prior to fabricating the hose the lining strip 25 is secured by suitable adhesives or other means to the strip 19. The composite strip 27 is then normally machine wound into a pipe or tube. The lining 25 may be slightly wider than the outer strip 19 to place the joint between successive spiral wraps under compression or a suitable adhesive may be employed to seal the joint to include the joint covering strip 20. The selection depends on the type of cellular material employed but the bore at the lining should be axially aligned with the outer surface of the hose.

Another form of light weight flexible hose is illustrated in FIGURE 3 in which a plastic or fabric strip 30 is employed, in one margin of which is provided a reinforcing spirally wound wire 32. The opposite edge of strip 30 is secured by suitable adhesives as 34.

These various forms of light weight flexible hose all have common shortcomings in that the interior of the hose presents to the flow of fluids a rough, grooved, or otherwise disfigured inner surface which creates turbulence and excessive frictional losses to the low pressure air or gas passing through the hose. My present hose lining is made so that the outer surface of the lining conforms to the interior surface of the hose wall. The inner surface of my cellular lining presents a smooth surface which provides a minimum resistance for this type of hose. In FIGURE 2 I employ a similar lining 52 which again fills such interiorly and spirally disposed grooves as 54 and provides the smooth interior 56.

In FIGURE 3, which illustrates a common form of this type of flexible hose, my lining 60 fills all the voids around wires 32 and at the same time gives support to the outer wall 30 of the hose so that it does not tend to collapse when the hose is passed around a sharp bend. The interior bore provided by lining 60 as illustrated at 62 is smooth and of uniform cross section.

Normally hose of the type used in handling gases and air have a supported wall after the showing of the various figures of the drawings in this application and they are made of various materals and variously constructed. The very nature of a hose which is relatively large in diameter and which must be light in weight, if it is to be easily handled and transported, requires the grooved or ribbed structure as illustrated to provide support for the wall of the hose. Such hose has been commonly used in the past for service of short duration where the efficiency of its gas flow was not a matter of prime concern.

With the advent of modern building there has been a general awakening to the need of air conditioning or where this is not required, at least to provide ventilation for enclosed spaces that otherwise do not have adequate ventilating openings. Air conditioning and ventilating of areas of human occupancy have generally relied upon metal tubing or fabricated metal duct work of various cross sections and it is not claimed for my cellular lining that the gas flow through a lined hose will equal that of a metal duct due to the fact that a microscopic examination of the cellular material reveals minute filaments which act to retard the air or gas flow. There are many occasions, however, where it is very difficult to install metal ducts or tubing in buildings already constructed and it is especially for such uses that the light weight hose has proven to be very practical for the conduction of ventilating air, gases and for the control of fumes and dust and also for the handling of such materials pneumatically. Further, there is a very appreciable savings in first cost of the ducts themselves and in the labor of installation.

Generally however the previous designs of the light weight hoses that have been studied have not enjoyed a wide application in these fields because they were too heavy, too rigid, too costly or would not meet the physical characteristics required for the particular application. This has been especially true where manually handled hoses were needed or where air had to be handled efficiently with minimum attendant friction losses in air conditioning applications.

A preferred material for my hose lining is plastic foam such as is made of vinyl, polyethylene, urethane-polyether or similar plastic materials. At this time the isocyanate-polyether flexible foams are most desirable. It may also be made of rubber foam, either in the form of latex foam or sponge rubber for certain uses. My material may be preformed to fit certain specific types of hose. It is placed in the hose normally during its manufacture and secured by a suitable adhesive to the inner surface of the outer wall of the tube. Cementing the liner to the outer covering or shell of the hose reinforces the same against crinkling or bucking as the hose is bent around obstacles in construction, particularly in ventilating or air conditioning. The cellular material of which the liner is formed is of a low density and therefore does not add very much to the total weight of the hose.

In addition to preventing frictional loss, a liner made after the teachings of this present invention has another desirable attribute, that of providing a cellular layer which prevents radiation or absorption of heat to or from ambient air.

FIGURE 4 has been added to illustrate another desirable characteristic, the acoustical value of my cellular hose liner. Ventilating and air conditioning flow of air is normally at relatively low pressure, the pressure being induced by some form of fan, none of which produce pressures exceeding a few pounds per square inch. This low pressure has a detrimental effect on the efficiency of the system but has generally been required in order to keep noise at a low level, as the passage of air, particularly in air conditioning systems, tends to conduct the sound of the fan in the form of vibration or pulsation. This is the restraining influence on the speed of air through the ducts, and this factor has the effect of requiring an increase in the size of the ducts which add to their costs. With the resilient sound deadening cellular structure of my liner there is a distinct decrease or dampening of the vibratory or pulsation noises and the graphs as shown in FIGURE 4 illustrate the result of many tests made under these conditions.

It is believed it will be reasonably apparent that this present hose liner has three unique characteristics in addition to being of a flexible nature. It provides a much improved air flow, excellent sound attenuation and a reasonably high K factor which shows good thermo insulation characteristics.

Having thus described my invention, I claim:

1. A lightweight flexible hose for conducting low pressure gases and adapted to be sharply bent while substantially preserving its normal internal cross-section comprising:
  (1) a laminated strip helically wound with the lateral margins of said strip in side-to-side engagement to form a closed wall cylinder; said laminated strip comprising:
    (A) an elongated sheet of gas-impervious and flexible material constituting the outer surface of said laminated strip and said hose;
    (B) a wire element embedded in at least one lateral margin of said sheet to provide at least one wire-reinforced lateral margin; and
    (C) a layer of low density cellular plastic material bonded to the interior surface of said sheet of material; said cellular layer having a thickness to accept displacement which takes place when the hose is sharply bent without appreciably disturbing the interior surface thereof; and
  (2) means interengaging with said wire-reinforced lateral margin and embracing the at least one wire element thereof to unite the lateral margins of said helically wound strip to form said hose.

2. A lightweight flexible hose for conducting low pressure gases and adapted to be sharply bent while substantially preserving its normal internal cross-section comprising:

(1) a laminated strip helically wound with the lateral margins of said strip in side-to-side engagement to form a closed wall cylinder; said laminated strip comprising:
   (A) an elongated sheet of gas-impervious and flexible material constituting the outer surface of said laminated strip and said hose;
   (B) a wire element embedded in each of the lateral margins of said sheet;
   (C) a layer of low density cellular plastic material bonded to the interior surface of said sheet of material; said cellular layer having a thickness to accept displacement which takes place when the hose is sharply bent without appreciably disturbing the interior surface thereof; and
(2) means interengaging adjacent outer margins of said outer plastic sheet of said helically wound laminated strip and embracing the wire embedded therein to unite the lateral margins of said helically wound strip to form said hose.

3. A lightweight flexible hose as recited in claim 2 in which said interengaging means comprises a flexible plastic strip formed to define two adjacent and parallel longitudinal grooves of semi-circular cross-section adapted to accept said wire reinforced lateral margins and hold the said margins in fixed adjacent relationship.

References Cited in the file of this patent
UNITED STATES PATENTS

| | | |
|---|---|---|
| 2,486,387 | Bringolf | Nov. 1, 1949 |
| 2,500,573 | Rockoff | Mar. 14, 1950 |
| 2,578,140 | Krupp et al. | Dec. 1, 1951 |
| 2,700,988 | Smisko | Feb. 1, 1955 |
| 2,731,040 | Warburton | Jan. 17, 1956 |
| 2,797,731 | Carlson | July 12, 1957 |
| 2,805,972 | Cross et al. | Sept. 10, 1957 |
| 2,936,792 | MacCracken et al. | May 17, 1960 |
| 2,973,295 | Rodgers | Feb. 28, 1961 |